Aug. 26, 1969   R. E. GALER   3,462,850
HEAT EXCHANGER

Filed Aug. 16, 1966   2 Sheets-Sheet 1

INVENTOR
RICHARD E. GALER

BY
Kane, Dalsimer, Kane & Smith
ATTORNEYS

Aug. 26, 1969  R. E. GALER  3,462,850
HEAT EXCHANGER
Filed Aug. 16, 1966  2 Sheets-Sheet 2

INVENTOR
RICHARD E. GALER
BY
Kane, Dalsimer, Kane & Smith
ATTORNEYS

United States Patent Office 3,462,850
Patented Aug. 26, 1969

3,462,850
HEAT EXCHANGER
Richard E. Galer, Alpena, Mich., assignor to National Gypsum Company, Buffalo, N.Y., a corporation of Delaware
Filed Aug. 16, 1966, Ser. No. 572,728
Int. Cl. F26b 17/10; F28f 19/02, 13/18
U.S. Cl. 34—57   7 Claims

ABSTRACT OF THE DISCLOSURE

This invention is directed to apparatus for cooling pulverulent material by introducing the material into a container in which there is a pressure differential between the point of introduction and that of exit. The pulverulent material is caused to flow around cooling tubes or the like through which a coolant is directed, with the cooling tubes being of such character as to have an external low wetting coefficient thereby substantially to preclude adherence of the pulverulent material thereupon as it passes through the container and about the tubes through which the coolant is flowing.

---

This invention relates to apparatus for cooling pulverulent materials of various types.

In the manufacture of cement, to which field this disclosure is primarily addressed, it is particularly important that the final product be adequately cooled prior to packaging or storing. Cement is prepared by suitably grinding clinker of desired composition. The clinker, at grinding time, is usually hot. The heat thereof is retained in the finally ground product. Further than this, even if the clinker is not hot when the grinding operation is started the process by which the clinker is transformed into a pulverulent mass always generates substantial heat that is transferred to the end-product.

This undesired heat resulting from the grinding operation comes about in the conversion of mechanical energy into the ground product. The grinding and powdering process develops heat which cannot be dissipated. Where the clinker to be ground is hot to start with, that heat is added to that developed in the pulverizing process and the total heat then present in the resulting pulverulent material is very great.

For many years, the cement industry has been plagued and concerned with such heat problems. It is particularly important that in the marketed product there shall be an efficient and generally rapid way by which the product can be cooled prior to transfer to bags, barrels, trucks or cars. The cooling should preferably reduce the end-product temperature to substantially room temperature by the time of use with very little difficulty. Normally, as the cement is ground, it reaches a temperature in a general range of at least 250° F. at a minimum. The end-product, while being a ground solid, nonetheless has many characteristics of a fluidized mass. Consequently, if attempts are made to transport and ship the end-product in its heated state, there is little likelihood that it will be cooled in the time between packaging or storing and the time of use. Such cooling as occurs is usually confined to areas close to exposed surfaces. Many times, when the freshly ground cement is placed within railway cars for shipment, it has been found that even though the exterior temperature may drop to ranges even well below the zero value on the Fahrenheit scale, the very nature of the cement product is such that the low temperature is ineffective as a cooling influence. From an illusrative aspect, it has been found hat cement stored in tank cars for long periods of time within which wide temperature variations occur, the very nature of the product mitigates against a cooling effect. The conditions are often such that in many instances the stored product retains approximately the temperature at which it was stored at depths exceeding only about five inches.

Unless cooling is provided, the worker in the field finds that efficient utilization of the product in the field is greatly curtailed. In the case of concrete road building, a failure to cool the cement prior to distribution may result in a very inferior finalized concrete product prepared from the cement. This comes about largely because of the problem of ascertaining the correct amount of water to add to the cement during the mixing. Heat in the cement prior to mixing tends to cause much water loss in mixing. Due to the heat of hydration the addition of an insufficient quantity of water tends to make the final end product particularly dry and crumbly. It is almost impossible to get workmen to mix the product in accordance with heat in it, and sometimes its temperature is no known. The result is that the end-product is often greatly weakened where here is an insufficient quantity of water added and a water loss can normally be expected because of the heat of hydration. If too much water is added the drying period is needlessly prolonged.

Some proposals have heretofore been made for cooling cement following the conversion of the clinker into a powdered mixture from which concrete may be formed or which may be used directly in order to provide a desired end-product. The known processes and the apparatus to achieve the result are often large and expensive. Further, the operational efficiency is often low enough to slow down a manufacturing procedure.

With the foregoing thoughts in mind, the invention has as its main objective that of providing at a nominal cost a greatly improved and more highly efficient cooling compound. The cooling is achieved within a chamber into which the hot pulverulent product is drawn. A pressure and circulation flow is developed within the chamber to cause the pulverulent material to circulate from a point of relatively high pressure to a point of relatively low pressure. The pulverulent material, in changing its location between the two pressure points, is caused to pass over a multiplicity of almost minute cross sectional size cooling units. The cooling units, when constructed in accordance with the disclosure of this application, are preferably in the form of extremely small diameter heat exchanging tubes which substantially close off the passage within the container between its product input and product output points so that the cement must pass over and about such elements in moving the inlet and output.

As the invention is constituted, the heat exchanger units preferably are composed of tubes having their tube walls formed of a fluorocarbon resin. The so-formed tubes generally have an extremely small internal diameter which may be only of the order of about 0.1 inch, with adjacent tubes being closely nested. The tubes often have a wall thickness of only between 5% and 15% of the tube diameter. In use, the tubes are positioned and held at either end by an appropriate header construction, with the header at one end serving as an inlet for any suitable controlling fluid unit and the tubes at their opposite ends being mounted on a second header into which these tubes are nested. Oftentimes, the tubes, because of their very small size, may be aligned in a generally regular formation or, the multiplicity of tubes may be in a staggered arrangement within the header so that any pulverulent material passing adjacent to them must follow a generally serpentine path in passing from a region of higher pressure to one of lower pressure or in circulating through a chosen volume.

Tubes forming a heat exchanging unit of this general nature are preferably of a form such that many tubes are required to fill even a relatively small volume. While any single tube of such small size formed from a fluorocarbon resin will not provide a transfer medium of high efficiency, the grouping of a large number in an extremely small area does give a greatly improved operation. It is well known that a tube formed of a fluorocarbon resin can be formed with an outside diameter substantially less than one-quarter of an inch. Tubes of this type can be nested very closely and thus provide a large cooling region so that good cooling can occur even though the thermal conductivity and overall heat transfer coefficient of an individual tube is low compared to nickel or copper tubing, for instance. Tubes of this type are extremely rugged in formation and are not easily breakable.

In a preferred form of the invention where the fluorocarbon tubes are nested into a header structure at each of their ends, the header structure forms generally a significant part of the side wall of the cooling container through which the pulverulent material is passed. Where the tubes are formed in nested arrays, the multiplicity of tubes is so closely spaced with respect to each other that the pulverulent material in passing between a region of high pressure to a region of relatively low pressure must of itself pass closely adjacent to the tubes. The fluorocarbon resin cooling units which are nested into the headers are arranged frequently in rows of tubular elements extending in directions completely transverse to the cooling unit and at least completely transverse to the normal path taken by material passing through the container. In many other instances, the tubes while terminating at headers, are nonetheless closely nested in such a way as to preclude any possibility of direct passage of material through the complete apparatus without contact or approximate contact with the tube surface. Mostly, the tubular elements of this polyester variety are quite inert to highly corrosive fluids. The plastic nature of the tubes is such as to make a component having extremely low surface tension of wetting. This fact of itself is such as to make extremely difficult the possibility of any ground or pulverized particles adhering thereto. It is, of course, extremely important that the installation be of utmost compactness but the compactness may only follow where an adequate number of nested components is utilized. Where a nested arrangement of such units is used, the cost of each item is extremely low and the nesting of the multiplicity of tubular elements provides for greatly increased space over which the unit may be assembled. This makes the cost of both the item and the installation very cheap. While, as above stated, the heat transfer for a tube of the character described is substantially less than that of a pure metal tube, such as carbon steel, nickel or copper, the compactness of the installation and the substantial number of tubes which can be located and positioned within any given volume is so great that the surface area which can be contacted by the material to be cooled is sufficiently great readily to overcome the need for a more efficient cooling per individual tube. The result is that the greatly increased area over which the cooling can be achieved results in a net efficiency which is greater than otherwise achievable.

In many instances, the tubular elements providing the heat transfer characteristic may be made in their entirety of the fluorocarbon resin. In other instances, where it becomes desirable to have the tubular elements provided with greater internal strength and also where it is particularly important that no sagging of the tubular elements should occur, the increased strength may be achieved by a metal tube of even a slightly larger size provided with a fluorocarbon resin coating on its exterior surface, this coating, as already intimated, being important in providing an outer surface area in a small space where the advantages of the low surface tension of wetting shall be provided and, yet, with it, reasonably efficient heat transfer.

The invention, accordingly, has one of its main objectives that of providing a cooling unit capable of handling for cooling large volumes of pulverulent material over relatively short time periods. This objective is achieved through the development of a pressure gradient through the cooling unit with the gradient being sufficient to cause the pulverulent material to pass with some rapidity over the cooling surface and yet, to provide a structure where the cooling efficiency is high.

Another object of the invention will be found to be that of providing for introducing pulverulent material into a cooling chamber and causing the introduced material to flow through the chamber relatively rapidly and to give up substantial heat within the chamber to a coolant circulated therethrough.

Other objects of the invention are those of providing a component for cooling pulverulent material which can be operated at minimal costs and in which the circulated volume of coolant can be reduced to a minimum and wherein because of the substantial number of cooling tubes, the unit number of cooling components can be increased for the same space as a unit of lesser efficiency.

Still other and further objects and advantages of the invention, of course, will make themselves known as the following description is considered in connection with the combined claims defining the invention although the invention has also been defined and disclosed with the aid of the accompanying drawings wherein:

Figure 1:
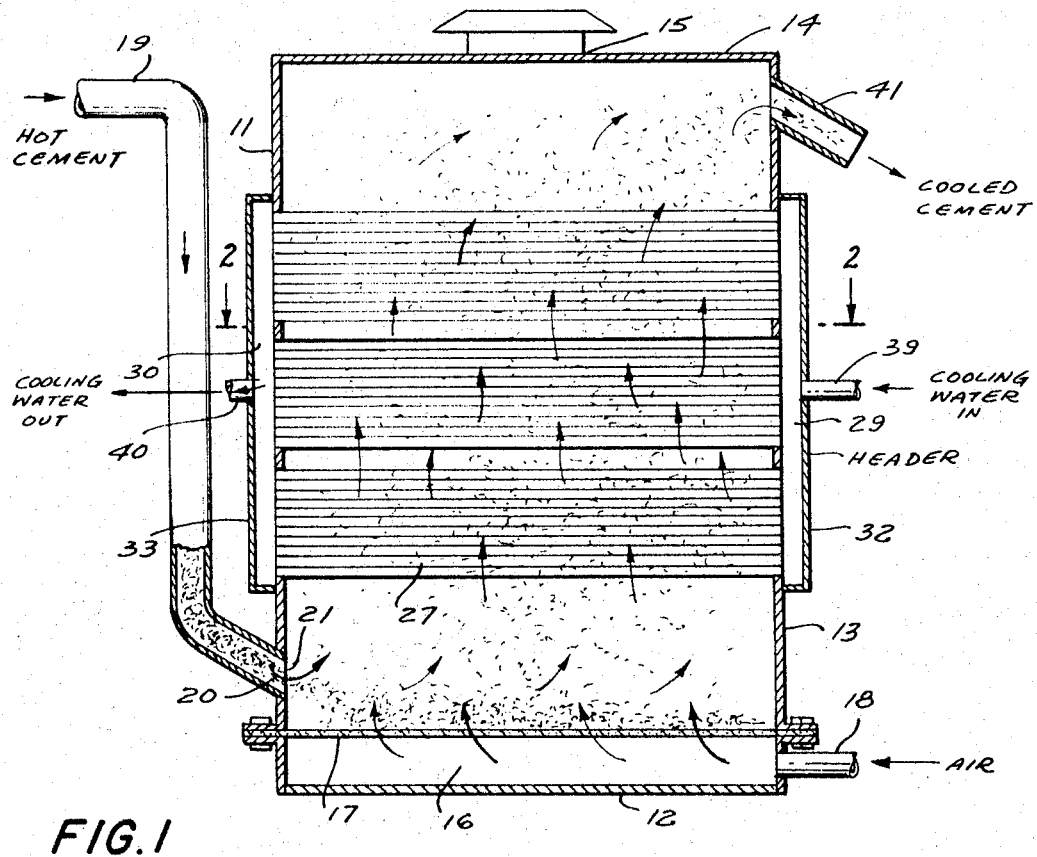
FIG. 1 is an elevation in section of a cooling unit wherein the heated material is circulated through the cooling unit under the influence of a graduated pressure difference causing it to flow about and around cooling components.

Referring now further to the drawings for an understanding of this invention, the cooling chamber 11 is preferably in the form of an upright structure having a base member 12 and upright side member 13. The uppermost or top portion 14 is provided at its central area with an outlet opening 15 through which fluid under pressure may escape. The lower portion of the chamber 11 incorporates an air inlet duct or passage 16 provided by forming the bottom surface 17 as a generally false bottom. The bottom surface 17 is generally porous and formed somewhat in the nature of a so-called "air-slide." Air or any other gas under pressure above atmospheric is introduced into the air inlet duct 16 through an inlet tube 18 leading into the duct passage. The air or other suitable fluid or gas coming into the cooling chamber via the air inlet tube 18 can pass through the porous bottom and create there a region of high pressure. For some operations it is important that the introduced fluid shall be non-reacting or oxidizing, particularly where the apparatus is used in the food processing field. The pressure built up progressively drops as the inlet fluid or gas passes from the bottom surface 17 through to the outlet opening 15. The pressure within the chamber 11 is thus greatest at the bottom through which the entering air passes and is least at the top. The ground cement, which is hot, enters in the direction of the arrows into the inlet tube 19. Any cement forced into the inlet tube 19 falls by gravity toward the tube bottom 20 and enters into the lower portion of the cooling chamber 11 at the region 21.

Figure 2:
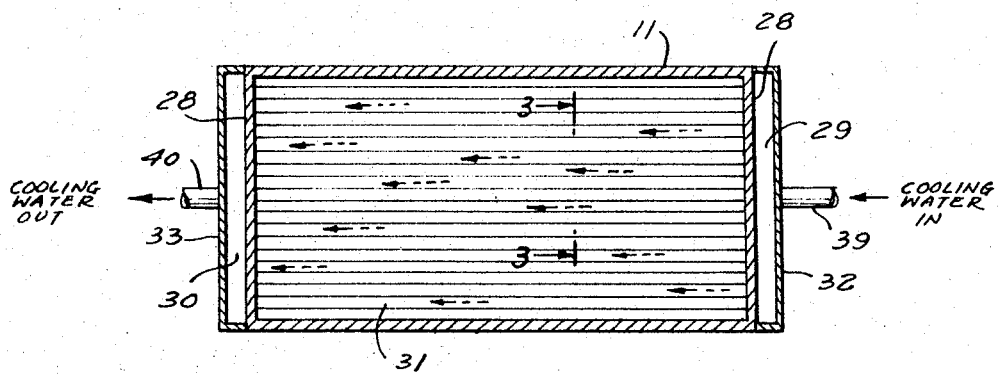
FIG. 2 is a sectional view taken on the line 2—2 of FIG. 1 looking in the direction of the arrows.
Figure 3:
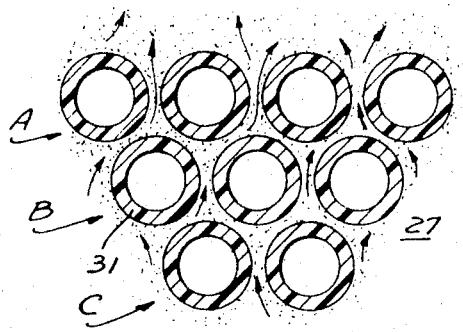
FIG. 3 and 4 are sectional views each taken on the line 3—3 of FIG. 2 where the section represents the circulating path of each of the cooling solution and the pulverulent material about the cooling tubular units.
Figure 4:
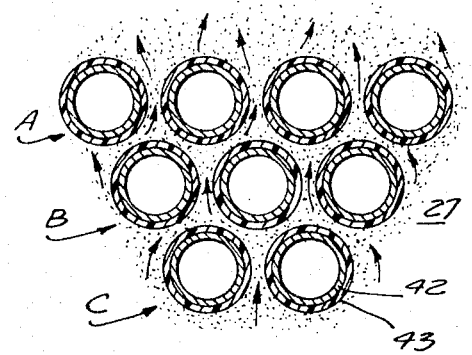

The entering cement, in its pulverulent state, is then agitated to some extent by reason of the air pressure developed through the bottom member 17. As soon as the agitated cement rises a bit within the container or chamber, it reaches a region whereat the cooling tubes 27 are located. The cooling tubes, as can be seen in section in FIGS. 3 and 4, each extend from one side wall 13 of the cooling chamber to the opposite side wall. At each end, the tubes are supported in a header structure 28 leading into a pressure manifold 29 at one end and into an outlet manifold 30 at the other end. The individual tubular members 31 (see FIG. 3) are preferably formed of a plastic material such as a fluorocarbon resin. Without in any way limiting this disclosure it may be mentioned that one form of such tube is that commonly known by the trade name and style of "Teflon" (a trademark of the Du Pont Company, Wilmington, Del.). As can be seen particularly by FIG. 3, the tubes 31 are all nested in a substantially staggered array. These tubes are all held at their ends in the header structure, as shown more particularly by FIG. 2. In many instances, it is desirable to have each row of the tubes aligned as shown by the rows, A, B and C, particularly in FIGS. 3 and 4. With each row of tubes terminating in a header structure which then connects into the inlet manifold 32 or the outlet manifold 33, as the case may be, the tubes are so arranged that several rows may be piled upon each other with the individual tubes displaced relative to each other as shown in FIGS. 3 and 4. So arranged, cooling fluid may enter through the cooling fluid tube 39 and come within the inlet pressure manifold 29 and thence pass through the tubes (see FIG. 2) to the outlet manifold 30 and thence outwardly through the output cooling tube 40.

The pulverized product, introduced into the chamber 11 by the inlet tube 19, circulates throughout the container and follows a generally upward path, as indicated by the arrows, until the cement product reaches essentially the top of the chamber 11 at which time it passes into the output tube 41 from which it is discharged as cooled cement into any suitable receiving unit (not shown). The cooled cement may be packaged in bags or barrels or it may be fed directly to trucks or tank cars or the like. The significant factor is that the warm cement product in pulverulent form enters through the tube 19 and, after being cooled by passing it over and about the cooling tubes, the cement product finally reaches the output tube 41 of the container from which it is discharged.

As shown in FIG. 3, the tubes 31 are all of generally plastic cross section. The tubes, however, may also be formed as metal tubes 42 (see FIG. 4) and be provided with a plastic outer coating 43. When the tubes are used as metal tubes with plastic outer coatings, it will be appreciated that the tubes are somewhat larger in size but, nonetheless, sufficiently small to permit extensive contact between the pulverulent material passed about the tubes, as illustrated by the arrows, until the material is drawn beyond the region of the tubes and toward the outlet.

Figure 5:
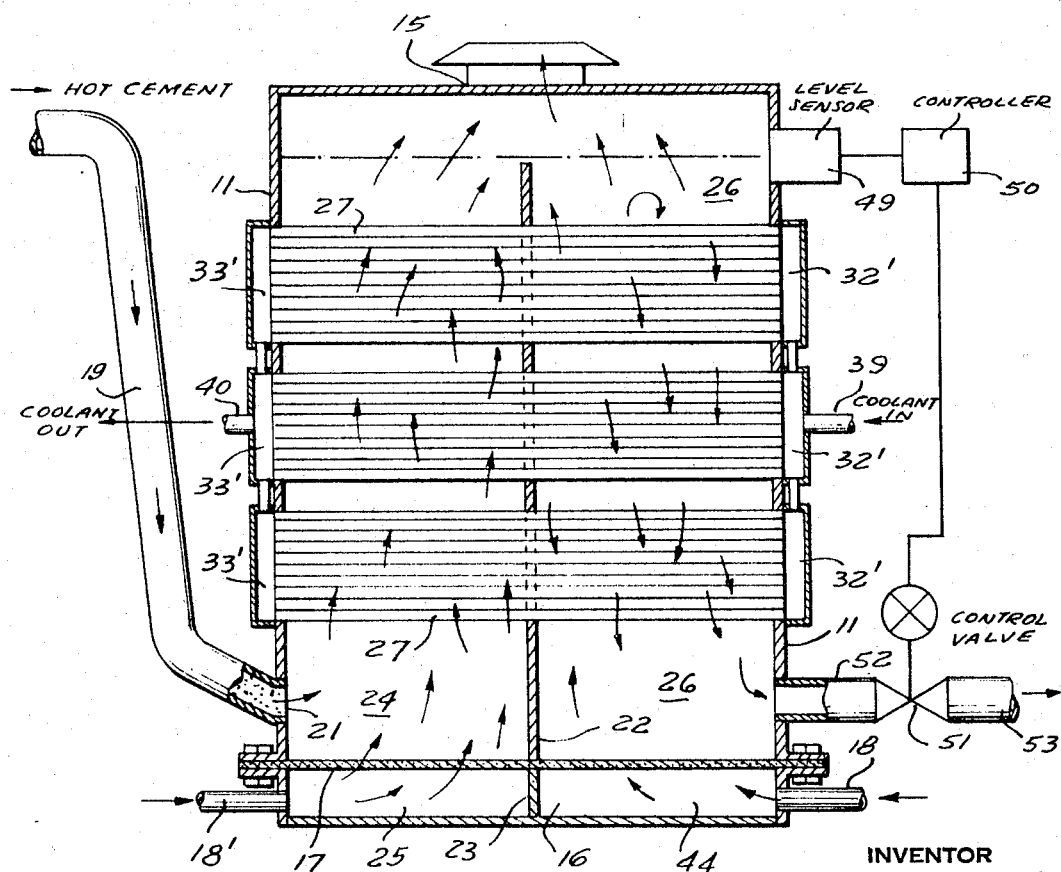
FIG. 5 represents a modification of the structure shown by FIG. 1 whereby the cooled cement product may be discharged from the lower rather than the upper side of the cabinet.

Reference may now be made to FIG. 5 showing a modification of the structure of FIG. 1 in which figure like parts are components are designated by like numerals. Here again, as in FIG. 1, the hot cement inpulverulent form enters through the tube 19 and passes into the cooling chamber 11 at the entrance port 21. Similar to the arrangement of FIG. 1, the fluid or air under reasonably high pressure (relative to atmospheric) enters into the side of the chamber 16, which has a porous bottom member 17, from an entry port 18. In this modification the cooling chamber 11 and the duct 16 are each divided by partitions 22 and 23, respectively, to form a left-side chamber 24 and left-side duct 25 and a right-side chamber 2 and right-side duct 44. For this modification, the air enters at 18 and passes through the bottom 17 to circulate the cement upwardly through the chamber 11. After passage about the cooling tubes, the entering cement follows the described path.

As the cement reaches the top of the divider partition 22 it "spills over" into the right side 26. At this point the cement can contact a level sensor 49 and through this unit the outlet valve 51 is controlled and the cement then falls through the right-side portion of the chamber and about the outer wall of the cooling tubes 27 to the outlet tube 53 and its feeder tube 52. Depending upon the controller 50 the control valve 51 is more or less open.

The pressure in air inlet 18 into the duct 16, as can be appreciated, is less than within the inlet 18' to permit the further circulation. The cement flow is, broadly speaking, schematically shown by the general pattern indicated by the numerous arrows.

The level sensor 49, as is well known, may be a mechanical unit functioning under control of the circulated product and effectively operating upon achieving a selected level to control a controller element also shown schematically at 50. The controller 50 operates a control valve schematically represented at 51. The pulverulent material, as accumulated within the cooling chamber, then may be withdrawn with the opening of the control valve by way of the outlet tube 53 and the feed tube 52 for any desired use. The arrangement of FIG. 5 is generally not quite as efficient as that of FIG. 1 but it is shown to indicate a modification which may occasionally prove feasible. The valve mechanism 51 can be of any desired type of control valve such for instance as a well known rubber sleeve type, a diaphragm type or other equivalent instrumentalities.

In some instances the cement feed tube 19 of FIG. 5 may be moved to a top entry port. At such time the bottom feed at 21 is no longer in operation and the partition 13 is removed. Either the air pressure on inlets 18 and 18' are then made alike or the entry tube 18' is closed off and the partition 23 in the duct is removed.

This provides a structure generally the reverse of that shown by FIG. 1 but which is less efficient and less desirable. In some uses, and particularly where space problems are encountered, it may prove quite suitable.

While the invention described is primarily related to the cement field, it is, however, to be understood that it also has other and further applications. In the food pocessing field, it often happens (particularly with packaged cereals) that some cooling is desirable prior to packaging. Also, in such fields, instead of the fluid introduced for circulating the entering material in its cooling being air, which is suitable for cement, it is often desirable that some more inert medium should be used in food processing. This is in order that the conveying fluid shall be non-reacting and non-oxidizing as far as the circulated product itself is concerned. Nitrogen or carbon dioxide, for instance, are often quite suitable for this purpose, particularly where there has been flash drying and cooling is desirable subsequent to cooking.

In some instances, the circulated medium to be cooled is not precisely in the form of pulverulent material but, illustratively, more flaky or even irregularly shaped. It becomes desirable at times also to provide the fluorocarbon resin type heat transfer tubes in slightly non-circular form so that flaky material may more readily circulate between the different sections. On the other hand, the coolant flowing through what has been described as the tubular elements may flow through any of the fluorocarbon resin, or metal or even glass internal structures about the latter two of which there is a covering of the fluorocarbon resinous type.

In the case of foodstuffs, such media are often in flaky form and often somewhat sticky or sugary in the heated state. It is, therefore, extremely important that the heat exchanger unit be of a material to which there shall be substantially no adherence of the product. The fluorocarbon resin tube had this advantage in the case of the cement.

While the transfer efficiency of any one fluorocarbon resinous tubular element is substantially less than that of some of the metal type tubes heretofore used in heat exchangers, this is not disadvantageous with the present invention. Copper, for instance, has a heat transfer efficiency which is many times that of the fluorocarbon resin tube but copper tubes usually are larger and materials passing thereover are apt to create surface effects which cause certain of the materials to tend to adhere to the outer surface of the tube and thus form somewhat of an insulating barrier to a heat transfer. The fluorocarbon resin type, on the other hand, is not subject to such adherence. Therefore, the overall efficiency of the type of heat exchanger here disclosed tends to compare very favorably with the metal tube. Further than thus, because the fluorocarbon resin type element may be made so much smaller, it is possible to nest many more within a given area and this factor also improves on the overall efficiency of the operation.

For the foregoing reasons, it will be apparent that from the standpoint of appropriate shaping of the fluorocarbon resinous element, substantial gains are realized. Under the circumstances, it is to be understood that when, in this application disclosure and claims, a tubular element is defined, this element may be regarded as being capable of being only quasi-tubular in form as long as its operational principles fall clearly within the scope of what is herein set forth. Likewise, within the scope of this disclosure, it will be understood that the reference herein given to pulverulent material not only will be understood to mean that the material is in the nature of a relatively fine powder or a dust but it also will be regarded as being capable of being granular and even irregularly shaped. In some instances, the material can even be flaky in nature and still fall within the intended scope of the invention although the latter shapes generally are not found in processing cement, which, of itself, is more in the nature of a powder or dust as it is introduced into the cooling chamber by the inlet passage 19 for circulation into the outlet.

Various other modifications in the described structure also may be made without departing in any respect from the spirit and scope of the invention as herein set forth.

Having now described the invention, what is claimed is:
1. Cooling apparatus for pulverulent material comprising:
   a substantially closed vessel including bottom, side and top wall members forming a chamber within;
   a gas-permeable member disposed adjacent to the bottom wall member of the chamber and both coextensive with and parallel to said bottom wall member to define a cooling area within that portion of the chamber above the gas-permeable member;
   means for introducing pulverulent material to be cooled into the cooling chamber in the region immediately above the gas-permeable member;
   means for introducing gas under pressure above atmospheric into the chamber below the gas-permeable member so that it is caused to flow through the gas-permeable member into the cooling chamber to entrain the introduced pulverulent material and carry it upwardly through the chamber from the material inlet to the hereinafter defined material outlet duct under the force of a pressure differential within the cooling area between said material inlet and outlet duct;
   an outlet duct for removing the cooled pulverulent material from the upper end of the chamber;
   at least one array of elements disposed in substantially transverse relation to both the sidewall members and the path taken by the pulverulent material through the chamber from the inlet to the outlet and extending between one opposite pair of sidewalls, said array being formed by a multiplicity of small, closely compacted and staggered tubular elements substantially filling the chamber space through which the pulverulent material is forced so that the pulverulent material in its passage through the chamber must pass in serpentine fashion around and substantially in contact with the outer surface of a plurality of tubular elements, said tubular elements having at least the outer surface formed of a low wetting coefficient plastic substantially to preclude adherence of the pulverulent material thereto in its movement past said elements;
   header means carried by said opposite pair of sidewalls within the cooling area external to the flowpath of the pulverulent material for supporting the tubular elements at their opposite ends;
   means for introducing a coolant under pressure into one of the header means;
   means for connecting one end of each tubular element to said one header to receive the supplied coolant;
   means to connect the opposite end of each tubular element to the other header for withdrawing the coolant after its passage through the multiplicity of tubular elements;
   said outlet duct connecting with the chamber for collecting the pulverulent material moved through the chamber subsequent to cooling; and
   means for permitting the escape of introduced gas from the chamber to maintain said pressure differential through the chamber which progressively decreases in magnitude between the introduction and discharge points for the pulverulent material.

2. The cooling apparatus as claimed in claim 1 wherein said outer surface of a low wetting coefficient plastic is uniformly disposed on and carried by a cylindrical metal tube.

3. The cooling apparatus as claimed in claim 1 wherein said means for the escape of introduced air is a vent formed in said vessel top wall.

4. The cooling apparatus as claimed in claim 1 wherein said tubular elements are of minute cross-sectional area.

5. The cooling apparatus as claimed in claim 4 wherein said tubular elements have an internal diameter of approximately 0.1 inch and a wall thickness of between 5% and 15% of the tube diameter.

6. The cooling apparatus as claimed in claim 1 wherein:
   the tubular elements are formed of a flexible plastic and adapted to flex and bend to at least a limited extent when pulverulent material is circulated around and past them.

7. The cooling apparatus as claimed in claim 1 wherein:
   the transversely extending tubular elements are formed of a fluorocarbon resin and are supported at their ends substantially at the walls of the cooling chamber and in regions between the supported ends are adapted to flex and bend within the flow path of the pulverulent material.

References Cited

UNITED STATES PATENTS

| | | | |
|---|---|---|---|
| 2,884,373 | 4/1959 | Bailey | 165—145 |
| 2,911,198 | 11/1959 | Kaslssan | 34—177 |
| 3,031,769 | 5/1962 | Wilson | 165—107 X |
| 3,203,404 | 8/1965 | Miller | 165—133 X |
| 3,228,456 | 1/1966 | Brown et al. | 165—180 |
| 3,384,557 | 5/1968 | Saller | 165—107 X |
| 3,264,751 | 8/1966 | McEntee | 165—104 X |
| 3,372,742 | 3/1968 | Forner | 165—104 X |

ROBERT A. O'LEARY, Primary Examiner

T. W. STREULE, Assistant Examiner

U.S. Cl. X.R.

165—104, 133

UNITED STATES PATENT OFFICE
CERTIFICATE OF CORRECTION

Patent No. 3,462,850                                      August 26, 1969

Richard E. Galer

It is certified that error appears in the above identified patent and that said Letters Patent are hereby corrected as shown below:

Column 2, line 18, "no" should read -- not --; line 20, "here" should read -- there --; lines 34 and 35, "compound" should read -- component --; line 49, after "moving" insert -- between --.

Signed and sealed this 21st day of April 1970.

(SEAL)
Attest:

Edward M. Fletcher, Jr.                               WILLIAM E. SCHUYLER, JR.
Attesting Officer                                                   Commissioner of Patents